United States Patent [19]

Wasserfuhr

[11] Patent Number: 5,019,015
[45] Date of Patent: May 28, 1991

[54] FLEXIBLE SHAFT COUPLING

[75] Inventor: Wilhelm Wasserfuhr, Castrop-Rauxel, Fed. Rep. of Germany

[73] Assignee: Rexnord Antriebstechnik Zweigniederlassung der Rexnord Gesellschaft mbH, Dortmund, Fed. Rep. of Germany

[21] Appl. No.: 367,972

[22] Filed: Jun. 19, 1989

[30] Foreign Application Priority Data

Jul. 1, 1988 [DE] Fed. Rep. of Germany ....... 3822207

[51] Int. Cl.⁵ .............................................. F16D 3/78
[52] U.S. Cl. ...................................... 464/99; 464/147
[58] Field of Search ........................... 464/98, 99, 147

[56] References Cited

U.S. PATENT DOCUMENTS

| | | | |
|---|---|---|---|
| 1,454,087 | 5/1923 | Thomas | 464/99 |
| 4,073,161 | 2/1978 | Bury | 464/99 |
| 4,214,457 | 7/1980 | Wade et al. | 464/99 |
| 4,708,692 | 11/1987 | Weiss | 464/147 X |
| 4,744,783 | 5/1988 | Downey | 464/99 |

FOREIGN PATENT DOCUMENTS 0184051 6/1986 European Pat. Off. .
3417801 11/1985 Fed. Rep. of Germany .
8609743 9/1986 Fed. Rep. of Germany .

Primary Examiner—Thomas R. Hannon
Attorney, Agent, or Firm—Toren, McGeady & Associates

[57] ABSTRACT

A flexible shaft coupling including coupling flanges and a stack of spring-elastic membranes mounted at an axial distance from the two coupling flanges. The stack of membranes is mounted on sleeves which are arranged on tightening bolts mounted alternatingly on a circle on one or the other of the coupling flanges. Spacer washers are arranged next to the stack of membranes. Each sleeve is a hardened cutting sleeve provided with a cutting edge. The cutting sleeve is forced into the respective bore of the stack of membranes and at least a portion of the cutting sleeve is forced into the corresponding bore of the coupling flange. The cutting sleeve has an outer diameter which is greater than the maximum diameter of the respective bore of the stack of membranes and of the corresponding bore in the coupling flange.

6 Claims, 4 Drawing Sheets

FLEXIBLE SHAFT COUPLING

BACKGROUND OF THE INVENTION

1. Field of the Invention

The present invention relates to a flexible shaft coupling. The invention particularly relates to a flexible shaft coupling including two coupling flanges for connecting additional coupling members thereto and a stack of springelastic membranes mounted at an axial distance from the two coupling flanges and connected to the flanges by means of tightening bolts which are mounted alternatingly on a circle on one or the other of the coupling flanges. The stack of membranes is mounted on tightening sleeves and is held together by means of the tightening bolts. Spacer washers are arranged next to the stack of membranes.

2. Description of the Related Art

Flexible shaft couplings of the above-described type have the purpose to directly transmit rotary motion with the application of torque while compensating any misalignments of the shafts during operation. The compensation of shaft misalignments is effected by connecting the stack of membranes as a flexible element alternatingly or cardanically to the two flanges. As a result, the entire flange unit can be displaced axially as well as angularly. Thus, when two couplings are used, a parallel displacement can also be compensated because the couplings are capable of being deflected axially as well as radially. However, such a flexible shaft coupling only operates properly if the rotary motion is transmitted with as little play and imbalance as possible. This means that the manufacture of such a shaft coupling is extremely complicated and expensive when exact connections between the stack of membranes and the coupling flanges is to be ensured.

A flexible shaft coupling of the above-described type is known, for example, from U.S. Pat. No. 4,073,161. In this shaft coupling, a connection with as little play as possible is to be achieved by means of an interference fit obtained by means of tightening bolts, cylindrical tightening sleeves, flange-like, integrally connected spacer washers and additional spacer washers. The stack of membranes is mounted on the sleeve with high accuracy of fit and is held together between the spacer washers by means of tightening bolts. To obtain a connection completely without play, such an interference fit must be manufactured very exactly, i.e., the bores in the coupling flanges and in the membranes and the spacing between bores and the pitch circle diameter must be manufactured within very narrow tolerances. Since tolerances cannot be avoided during manufacturing, frequently bracing occurs during the assembly of such a coupling. Because of these tolerances resulting from production, it can also not be excluded that under torque application some of the bolt shafts and the bore walls are subjected to higher loads. As a result, in some of the bolt connections within the coupling system, impermissibly high stresses occur in the bores and shear forces occur, since the rotary motion and the load are not uniformly distributed over all the bolt connections. This may lead to a misalignment of the surrounding coupling flanges and to imbalances and wear.

Another shaft coupling of the above-described type is known from German Auslegeschrift 26 45 600. In this shaft coupling, a preassembled pack is formed by a stack of membranes together with a centering ring connected to tightening bolts. The centering ring has a finely finished circumferential surface which, together with a correspondingly finely finished circumferential surface of a flange, forms a cylindrical press or interference fit. This preassembled stack or unit is fastened alternatingly to one of the two flanges by means of tightening bolts, with the possible intermediate arrangement of guide sleeves. In this shaft coupling, the stack of membranes is held in a centered position by means of the centering ring, however, no measures are provided for compensating the play between the tightening bolts and the stack of membranes which play is due to manufacturing tolerances. When impact-like loads occur, the bolts may be displaced due to the play which leads to an additional imbalance.

In order to avoid the danger of misalignments and play and the resulting imbalances, it has been attempted to provide a shaft coupling which is completely free of play. In a shaft coupling known from European application 0,184,051, the play due to manufacturing tolerances is to be eliminated by means of a conical bolt shaft with a correspondingly conical expansion sleeve.

However, the above coupling has the disadvantage that stresses are introduced into the components through the bores during expansion, particularly into the stack of membranes. In addition, the cone of the bolt shaft and the conical bore in the expansion sleeve must be manufactured very precisely in order to obtain a uniform expansion because otherwise non-uniform tensions in the bores would occur over the thickness of the stack of membranes. These tensions would disadvantageously affect the operation of the coupling.

It is, therefore, the primary object of the present invention to provide a flexible shaft coupling of the abovedescribed type which is as much as possible completely free of play and imbalance. Simultaneously, the forces resulting from the torque to be transmitted are uniformly distributed over all bolt connections in order to obtain a greater power density, i.e., a higher transmittable torque with the same or smaller dimensions.

SUMMARY OF THE INVENTION

In accordance with the present invention, in a flexible shaft coupling of the above-described type, each tightening sleeve is a hardened cutting or tapping sleeve provided with a cutting edge. The cutting sleeve is forced or pressed into the respective bore of the stack of membranes and at least a portion of the cutting sleeve is forced or pressed into the corresponding coupling flange. The cutting sleeve has an outer diameter which is greater than the maximum possible diameter of the bore of the stack of membranes and of the corresponding bore in the coupling flange.

A virtually complete elimination of play and misalignment is obtained by forming the tightening sleeve as a hardened cutting sleeve with cutting edge. This is because when the cutting sleeve is forced into the bore, the cutting edge of the cutting sleeve cuts the material from the borehole walls and, thus, compensates any misalignment and manufacturing tolerances without resulting in permanent tensions in the system. Simultaneously, a press or interference fit is created which is without play and ensures that the forces resulting from a torque to be transmitted are uniformly distributed over all sleeves of the coupling and, thus, an equal load is applied to each sleeve.

Since the cutting sleeve penetrates partially into the bore of the coupling flange, the buckling strength of the connection is reduced which means that the quality of the clamping is improved. The tightening bolts have the purpose to secure a tight contact of the individual membranes with each other to form a stack of membranes and, thus, prevents the formation of spaces between the membranes. The flexible shaft coupling according to the present invention which is almost entirely free of play and imbalances makes it possible to realize substantially higher rates of rotation when compared to previously known couplings.

In accordance with a particularly advantageous feature of the present invention, the cutting sleeves are pressed into the corresponding bores of the stack of membranes and essentially completely in the corresponding boreholes of the coupling flange. This feature of the present invention substantially improves the stability of the coupling connection because the flexibility of the connection between the sleeves and the membranes is substantially reduced.

It has been found particularly advantageous if the outer diameter of the cutting sleeve is approximately 0.1 mm greater than the maximum diameter of the boreholes of the membranes and of the boreholes of the coupling flanges, wherein the maximum diameters are determined by the manufacturing tolerance. The greater diameter of the cutting sleeve as compared to the diameters of the bores ensures that, when the cutting sleeve is pressed in, the cutting edge cuts into the material of the bore walls in such a way that the misalignment and the manufacturing tolerances are completely compensated. Simultaneously, a press or interference fit which is free of play is obtained, so that a uniform force transmission to all sleeves is ensured and imbalances are avoided. The sleeves have an inner diameter which is selected such that commercially available bolts can be used for fixing the entire system and, thus, expensive fitted bolts are unnecessary.

In accordance with an advantageous further development of the invention, the cutting sleeve is integrally formed with the tightening bolt. This development is used particularly when small forces are to be transmitted, i.e., when bolts having small shaft diameters can be used. Because little space is available in this situation, it is especially advantageous that additional sleeves are not necessary.

In accordance with another embodiment of the present invention, each tightening bolt essentially has two portions, wherein the portion facing the bolt head is a cylindrical shaft with cutting edge and the other free portion has an external thread for receiving a check nut.

In accordance with another embodiment, it is also possible to construct the tightening screw cylindrically with a cutting edge at the free end thereof and to provide at the free end a central internal bore with internal thread for a counter screw.

In the two embodiments of the present invention mentioned last, the tightening bolt proper forms the cutting sleeve with the cutting edge.

In order to meet the above-mentioned objects, the present invention also is directed to a method of manufacturing a flexible shaft coupling of the above-described type. The method includes initially positioning the stack of membranes, the spacer washers and the coupling flanges and subsequently forcing all cutting sleeves simultaneously and uniformly into the bores first from one side and then from the other side.

The method according to the present invention provides the result that all sleeves are forced into the boreholes uniformly and without misalignment, so that imbalances are avoided. The method of the invention is advantageously carried out by means of a power press. After the cutting sleeves have been forced in, the tightening screws are inserted and are provided with the corresponding counter nuts. As a result, a tight contact between the individual membranes to form a stack of membranes is ensured.

The various features of novelty which characterize the invention are pointed out with particularity in the claims annexed to and forming a part of this disclosure. For a better understanding of the invention, its operating advantages attained by its use, reference should be had to the drawing and descriptive matter in which there are illustrated and described preferred embodiments of the invention.

DESCRIPTION OF THE PREFERRED EMBODIMENTS

Figure 1:
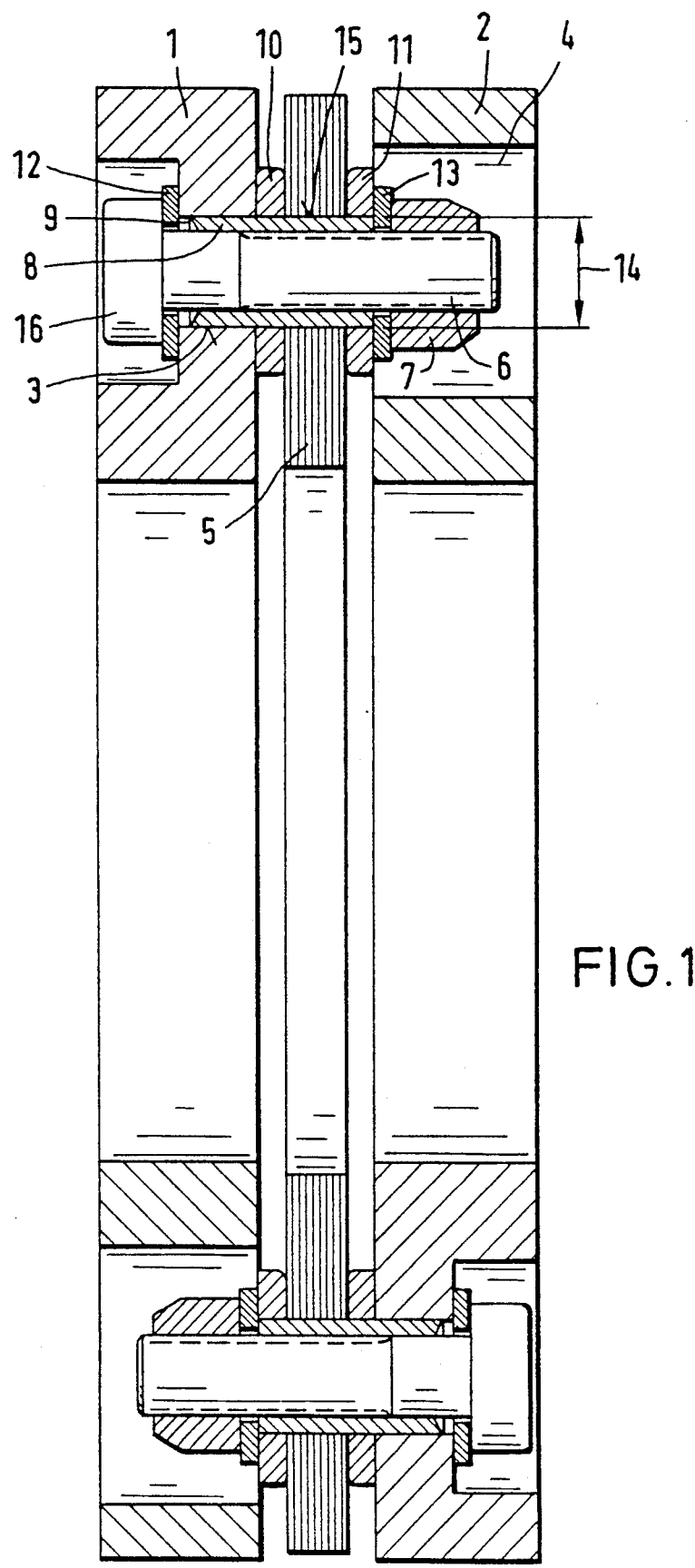
FIG. 1 is an axial sectional view of a first embodiment of the flexible shaft coupling according to the present invention.

As illustrated in FIG. 1 of the drawing, a flexible shaft coupling includes two coupling flanges which are each connected for rotation with an end of a shaft or the like, not illustrated in detail in the drawing. Bores 3 and 4 are provided in each flange on a common circle. Bores 4 have a greater diameter than bores 3 and are arranged alternatingly with bores 3. A stack of membranes 5 is arranged between the two coupling flanges 1, 2. An individual stack of plates may also be arranged at each bore. The stack of membranes arranged spaced apart from and between the flanges 1 and 2 is screwed alternatingly to one or the other of the two flanges by means of tightening bolts 6. As can be seen in the drawing, a bore 3 in one flange is located opposite the bore 4 in the other flange. Thus, when the stack of membranes 5 is connected by means of the bolt 6 on the coupling flange 1, a play exists on the opposite flange 2 between the wall of bore 4 and a counter nut 7 placed on bolt 6.

The stack of membranes 5 is not mounted directly on the tightening bolt 6, but rather is mounted on a hardened cutting or tapping sleeve 8 which is provided with a cutting edge 9. In addition, spacer washers 10, 11 are arranged on both sides of the stack of membranes 5. Also, a washer 12 is arranged under the head 16 of bolt 6 and a washer 13 is provided under the counter nut 7.

The stack of membranes 5 is provided with a plurality of bores 15 which are arranged on a circle corresponding to the bores 3 and 4 and in alignment with the bores 3 and 4. The cutting sleeve 8 has prior to being forced into the bores an outer diameter 14 which is approximately 0.1 mm greater than the maximum misalignment of the bores and the maximum diameter of the bores, particularly of the bores 15 in the stack of membranes 5. Thus, when the cutting sleeve 8 is forced into the bores, the cutting edge 9 cuts into the bores 3 and 15 as well as into the bores of the spacer washers 10 and 11, so that finishing tolerances and misalignments are compensated. In order to increase the resistance to buckling, the cutting sleeve is forced into bore 3 over essentially the entire length of bore 3. Thus, the cutting sleeve 8 penetrates the bore 3 almost to the bolt head 16.

Figure 2:
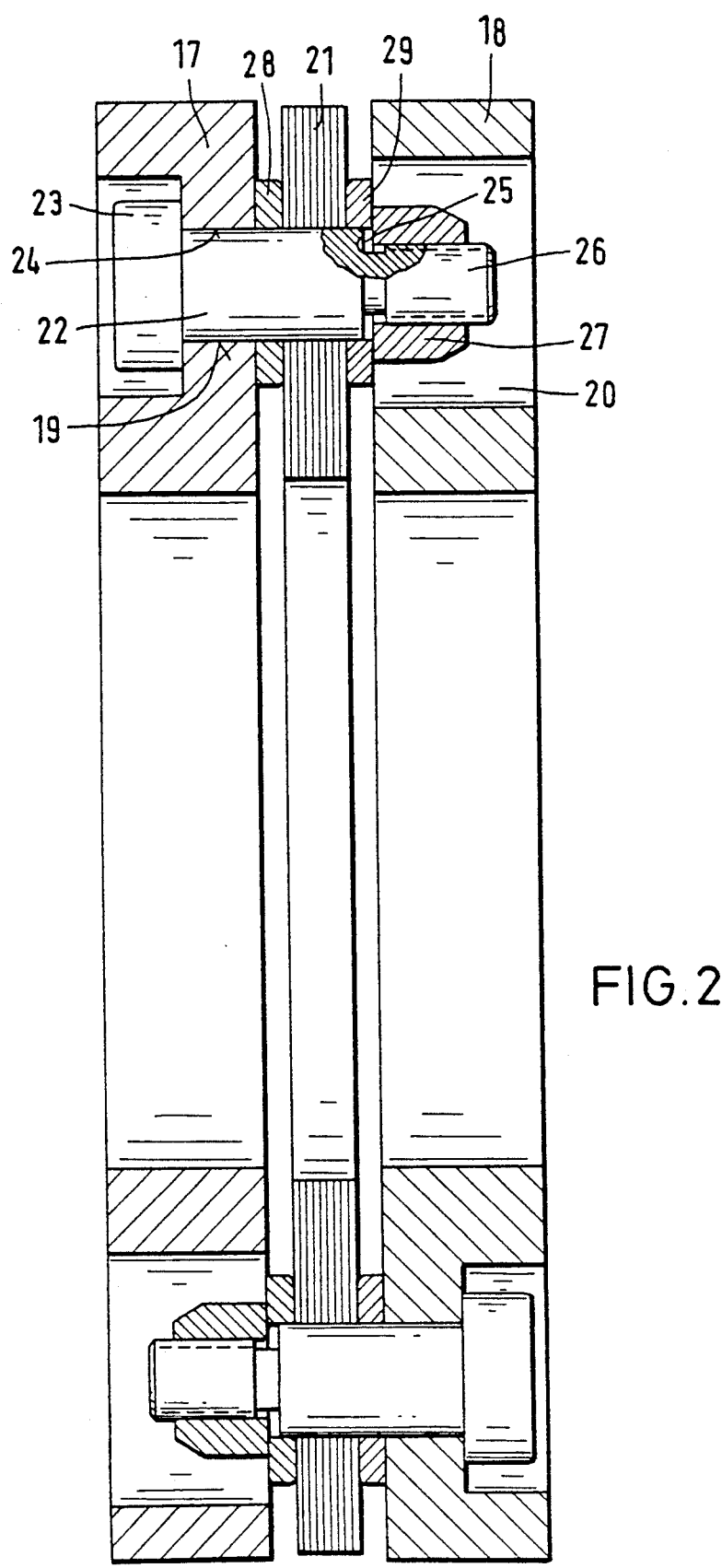
FIG. 2 is an axial sectional view of a second embodiment of the flexible shaft coupling according to the present invention.

A modified flexible shaft coupling according to the present invention is shown in FIG. 2. In this embodiment, the flexible shaft coupling has two coupling flanges 17 and 18 which are provided alternatingly with bores 19 and 20 on a common circle. A stack of membranes 21 is arranged between the coupling flanges 17 and 18. The stack of membranes 21 is fastened by means of tightening bolts 22 alternatingly to one or the other of the flanges 17 and 18.

Each tightening bolt 22 has essentially two portions. A portion 24 facing the head 23 is a cylindrical shaft with a cutting edge 25 and the other free portion 26 has an external thread for a counter nut 27. In addition, spacer washers 28 and 29 are provided on both sides of the stack of membranes 21.

Thus, in the embodiment of FIG. 2, the portion 24 of bolt 6 acts as a cutting sleeve. The portion 24 is forced into the bores, so that material is cut from the bores by means of cutting edge 25. For this purpose, the outer diameter of the cylindrical portion 24 of each bolt 22 is approximately 0.1 mm greater than the maximum misalignment and diameter of the bores due to manufacturing tolerances. This embodiment in which the cutting sleeve is integrally formed in the bolt 24 is particularly suitable for those cases in which only small coupling forces are to be transmitted, i.e., in cases in which screws with relatively small shaft diameters must be used or when insufficient space is available for an additional cutting sleeve.

Figure 3:
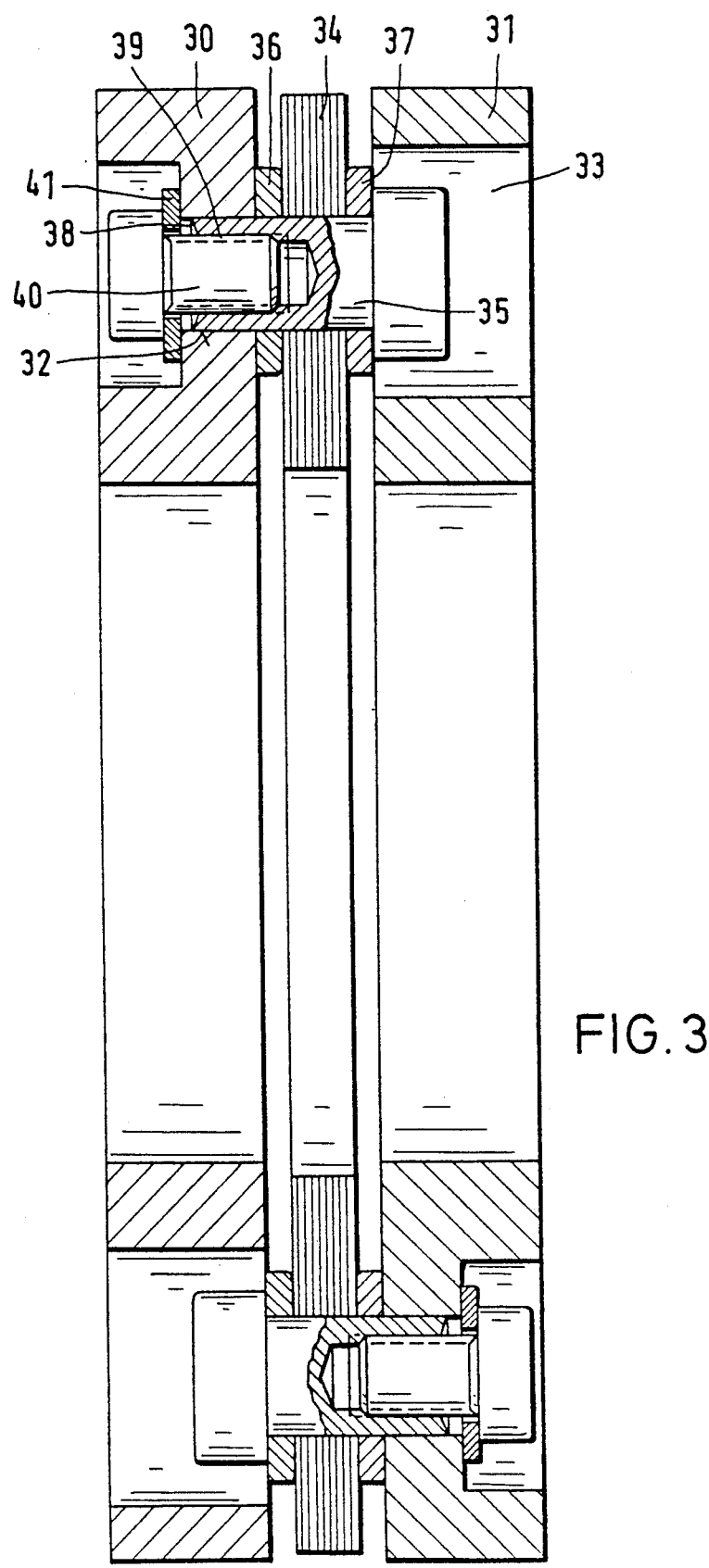
FIG. 3 is an axial sectional view of a third embodiment of the flexible shaft coupling according to the present invention.

A third embodiment of the present invention is shown in FIG. 3. In this embodiment, the flexible shaft coupling includes two coupling flanges 30 and 31 with alternatingly arranged bores 32 and 33. A stack of membranes 34 is arranged between the coupling flanges 30 and 31. The stack of membranes 34 is mounted on bolts 35 with spacer washers 36 and 37. Each bolt 35 has a cylindrical shaft and is provided with a cutting edge 38. The shaft of the bolt 35 has a central internal bore 39 with an internal thread for a counter bolt 40. A washer 41 placed under the head of counter bolt 40 is also provided. In this embodiment, the bolts 35 also act as cutting sleeves and are forced alternatingly from one and the other side into the bores of the flanges and of the stack of membranes 34.

Figure 4:
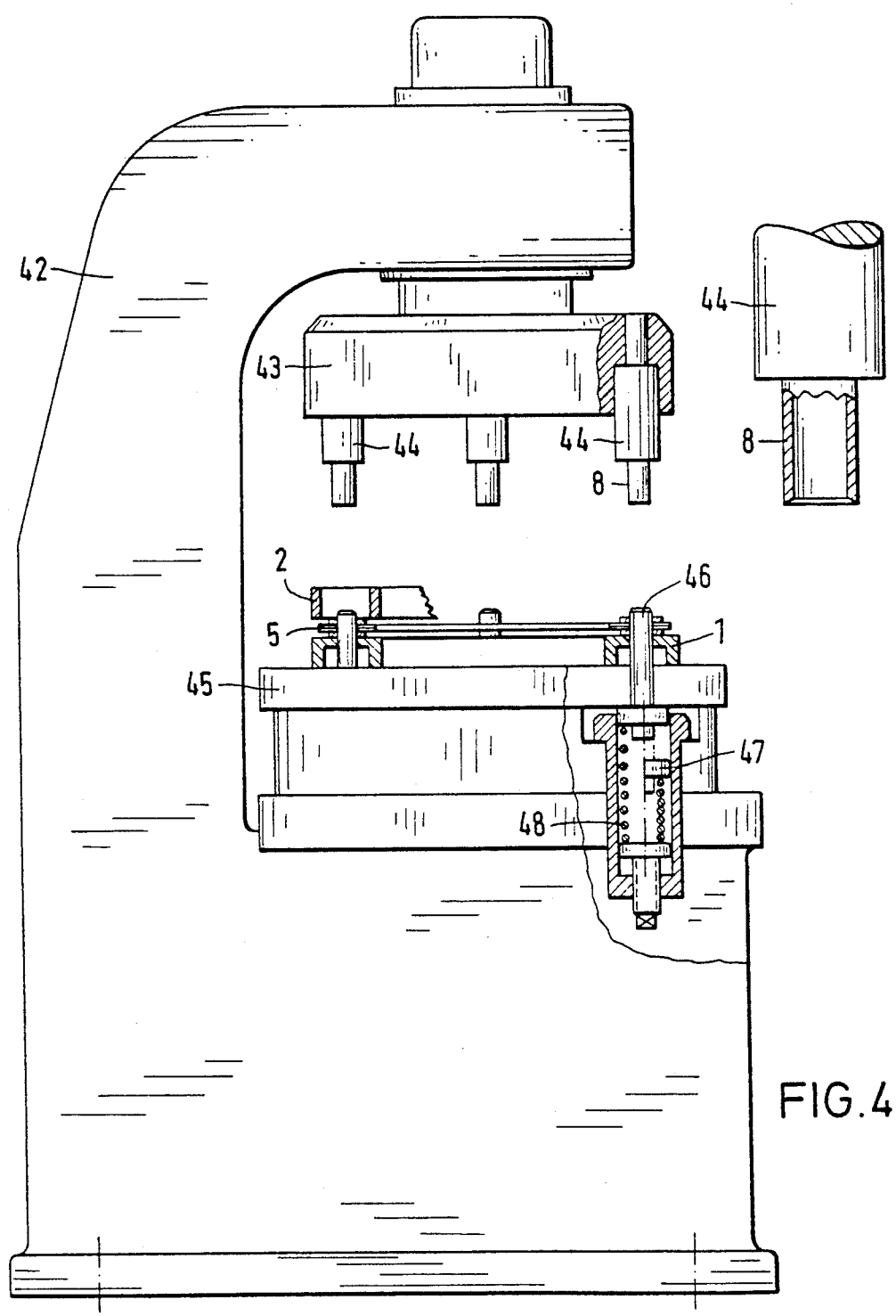
FIG. 4 is a schematic elevational view, partly in section, of a pressing apparatus for carrying out the method of the present invention.

FIG. 4 of the drawing shows a pressing apparatus 42 suitable for assembling the above-described flexible shaft couplings, particularly for assembling the coupling shown in FIG. 1. Apparatus 42 has an upper die 43 with pressing tools 44 arranged in a circle corresponding to the bores in the stack of membranes. Pressing tools 44 are used for forcing in the cutting sleeves 8. FIG. 4 further shows a pressing tool 44 and a cutting sleeve 8 on a larger scale.

A circular press table 45 is arranged underneath upper die 43. Retractable positioning devices 46 are arranged in the circular press table 45. A positioning device 46 is arranged opposite each pressing tool 44. The positioning devices 46 are cylindrical and can be pressed into recesses 47. Elastic restoring members 48 are provided for returning the positioning devices 46 into the initial positions after they are released. The outer diameter of each positioning device 46 is selected in accordance with the diameter of the bores in the stack of membranes and bore 3 in the coupling flange.

For assembling the flexible shaft coupling according to the invention, initially the stack of membranes 5, the spacer washers 10, 11 and the coupling flanges 1, 2 are positioned by means of the positioning device 46 exactly on the table 45 of the pressing apparatus 42. Subsequently, first all cutting sleeves 8 are simultaneously forced from one side into the bores by means of the pressing tools 44, so that the cutting sleeves 8 are cut into the bores by means of the cutting edges 9. The coupling is then turned, so that its other side faces upwardly. Subsequently, all the cutting sleeves 8 on the other side of the coupling are simultaneously forced into the bores.

By simultaneously and uniformly forcing all sleeves from one side into the bores, a compensation of the misalignment tolerances and diameter tolerances is achieved by the abovedescribed cutting of the bores. Subsequently, the bolts 6 with the washers 12 and 13 and the nuts 7 are mounted. The bolts ensure a tight contact between the individual membranes and, thus, prevent the formation of a spacing between the individual membranes of the stack of membranes and, thus, reduce the buckling tendency of the connections between membranes and sleeves.

Of course, the present invention is not limited to the embodiments described above and illustrated in the drawing. For example, it is possible to arrange several flexible shaft couplings according to the present invention in order to be able to compensate an axial displacement between a drive shaft and a driven shaft.

While specific embodiments of the invention have been shown and described in detail to illustrate the application of the inventive principles, it will be understood that the invention may be embodied otherwise without departing from such principles.

I claim

1. A flexible shaft coupling, comprising first and second coupling flanges and a stack of spring-elastic membranes mounted at an axial distance from the two coupling flanges, the coupling flanges having bores arranged alternatingly on a circle on the first coupling flange and on the second coupling flange, tightening bolts being mounted in the bores, each tightening bolt provided with a sleeve, the stack of membranes having bores in alignment with the bores of the stack of membranes, the stack of membranes being held together by means of the tightening bolts, a spacer washer each being arranged next to each side of the stack of membranes, each sleeve being a hardened cutting sleeve provided with a cutting edge, each cutting sleeve being forced into the respective bore of the stack of membranes and at least a portion of the cutting sleeve being forced into the corresponding bore of the coupling flange, wherein each cutting sleeve has an outer diameter which is greater than the maximum diameter of the respective bore of the stack of membranes and of the corresponding bore in the coupling flange.

2. The flexible shaft coupling according to claim 1, wherein the cutting sleeve is forced essentially entirely into the corresponding bore of the coupling flange.

3. The flexible shaft coupling according to claim 1, wherein the bore has a maximum bore misalignment, and wherein the cutting sleeve has an outer diameter which is approximately 0.1 mm greater than the maximum bore misalignment and diameter of the bore due to manufacturing tolerances.

4. The flexible shaft coupling according to claim 1, wherein each cutting sleeve is integrally formed with the tightening bolt.

5. The flexible shaft coupling according to claim 4, wherein the tightening bolt has a head, the tightening bolt comprising a first cylindrical shaft portion facing the head of the tightening bolt and a second freely extending portion, the second portion having an external thread for a counter nut.

6. The flexible shaft coupling according to claim 4, wherein the tightening bolt has a cylindrical shaft portion defining a cutting edge at a free end thereof, a central internal bore being provided at the free end, the internal bore having an internal thread for a counter screw.

* * * * *